United States Patent [19]

Santagiuliana

[11] Patent Number: 5,480,071
[45] Date of Patent: Jan. 2, 1996

[54] MEASURING DEVICE FOR POWDER PRODUCTS

[75] Inventor: Evans Santagiuliana, Vicenza, Italy

[73] Assignee: Taplast Srl, Povolaro Dueville (VI), Italy

[21] Appl. No.: 244,776

[22] Filed: Jul. 25, 1994

[30] Foreign Application Priority Data

Feb. 14, 1992 [IT] Italy .................. VI92A0021

[51] Int. Cl.⁶ ............................................ G01F 11/26
[52] U.S. Cl. ............................ 222/455; 222/456; 220/254
[58] Field of Search .................... 222/454, 455, 222/456, 556; 220/254

[56] References Cited

U.S. PATENT DOCUMENTS

| | | | |
|---|---|---|---|
| 4,898,292 | 2/1990 | VerWeyst et al. | 220/254 |
| 5,011,048 | 4/1991 | Mark | 222/455 |
| 5,029,736 | 7/1991 | Maruyama et al. | 222/455 |
| 5,143,261 | 9/1992 | Drobish | 222/455 |

FOREIGN PATENT DOCUMENTS 1202672  10/1965  Germany .................. 222/455

Primary Examiner—William A. Cuchlinski, Jr.
Assistant Examiner—Lisa Douglas
Attorney, Agent, or Firm—Watson, Cole, Grindle & Watson

[57] ABSTRACT

The invention discloses a measuring and dispensing device for granular or powdered products in which a tubular body is sleevable within the neck of the product container and is closed by a cap having a lid portion. The tubular body has a divider in the form of a diaphragm which defines a measuring chamber which communicates with the interior of the container and a collecting chamber which communicates with the measuring chamber and an outlet duct.

10 Claims, 5 Drawing Sheets

MEASURING DEVICE FOR POWDER PRODUCTS

The invention concerns a measuring/dispensing device for granular or powder substances, to be applied on the neck of a container.

A number of measuring devices for powder or granular substances find an increasingly wider use on the market. Said devices are applied on containers and make it possible to measure the product properly and dispense their contents in constant quantities.

Special reference is made to measuring devices for detergents for domestic use, as well as for products for personal hygiene.

Some measuring devices belonging to the known technique consist of a complex apparatus with moving and fixed mechanisms. The fixed mechanisms into which the product enters when the container is capsized, allow the measuring of the product transferring it into a collecting chamber. From the collecting chamber the product which flows out through a dispensing duct is dispensed when the container is capsized again.

The Italian patent application No. VI91A000092 in the name of the same inventor, foresees the realization of a measuring/dispensing device, consisting of a lower part presenting a collecting chamber suited to receive the measured product, and an upper part which is connected to the lower one, defining a pre-measuring chamber and a dispensing duct.

The substance in the container enters into the measuring chamber when the container neck is turned upside down. From the measuring chamber the substance is conveyed into the collecting chamber when the container neck is brought back to its upright position, while the dispensing of the product occurs when the container is capsized again and the product flows out of the collecting chamber into the outside environment going through the dispensing duct.

Even though said device functions satisfactorily, it presents some inconveniences in that its production is rather costly because of the complex geometry of the surfaces forming it, which, therefore, require the construction of complex molds.

Another inconvenience is that, since said device consists of various components, it is necessary to use several molds, one for each of the parts to be constructed. Moreover, it is necessary to foresee proper equipment for the assembly of the pieces. EP-A-0 410 620 discloses a simple measuring device for powder products with a lid connected to the dispensing chamber to dispense measured quantity of product. This document does not disclose a second lid to allow dispensing of a continuous quantity of product.

It is a purpose of the present invention to provide a measuring device for powder product in which the cap of said device has two different lids, one for dispensing a measured quantity of product, the second one for dispensing a continuous quantity of product.

It is another purpose of the present invention to have a simple measuring/dispensing device which may be manufactured at low cost.

Another purpose is to obtain a measuring/dispensing device which not only guarantees a quick and simple dispensing manoeuvre, but also insures the dispensing of constant quantities of product.

The last but not least purpose of the invention is to obtain a measuring/dispensing device consisting of a single piece.

The mentioned purposes and others, which will be better illustrated hereafter, are reached by a measuring/dispensing device for granular or powder products which, in accordance with the main claim, comprises:

a tubular body presenting a first part, inserted in the neck of a product container, and a second part, more external and coaxially matched with the first one, provided with elements connecting it rigidly with the neck of said container;

a cap, connected with the tubular body through a first hinge which shuts with a snap on the rim of the tubular body, provided with at least a lid connected with said cap through a second hinge and fit to be opened by rotation and is characterized in that said tubular body presents in its interior at least a diaphragm dividing the inner volume and defining a measuring chamber, communicating with the interior of said container close to the end of said diaphragm, and a collecting chamber communicating with said measuring chamber, both chambers being limited in the upper area by said cap, whereby said collecting chamber is connected with a dispensing duct arranged in the top section in correspondence with the cap and communicating with the outside environment.

According to a preferred embodiment of the invention, the measuring/dispensing device presents hinges, connecting the cad with the tubular neck of the container, made of thin plastic strips constituting a single body with the pieces they join together, so that the measuring/dispensing device can be made with a single moulding operation and, therefore, in a single piece.

According to a preferred embodiment of the invention the measuring and collecting chambers and the dispensing duct are realized in the interior of the tubular body by means of a diaphragm arranged coaxiallly with the tubular body and intersecting another diaphragm arranged at a slanted position, both of said diaphragms being fixed to the inside wall of the tubular body itself and being preferably realized as an integral part of the same.

A different embodiment foresees that said measuring and collecting chamber as well as said dispensing duct be obtained by closing the bottom area of the tubular duct with a bottom and by dividing its inner volume with a single diaphragm arranged co-axially with it, which, starting from the cap, runs through part of the length of said duct. In such an embodiment, openings made laterally in the tubular body itself, make possible the conveyance of the product from the container to the measuring chamber.

Moreover, the cap is fitted with two lids: a first lid, communicating with the measuring chamber, permits the continuous dispensing, whereas a second lid, communicating with the dispensing duct which overlyes the collecting chamber, permits the dispensing of the pre-measured dose.

Further characteristics and details of applicability of the present invention will become apparent from the detailed description given hereinafter. However, it should be understood that the detailed description and the specific examples, while indicating preferred embodiments of the invention, are given by way of illustration only since various changes and modifications within the spirit and scope of the invention will become apparent to those skilled in the art from this detailed description and from the drawings, wherein.

Figure 5:
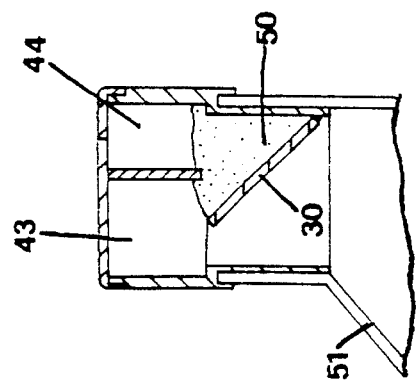
FIG. 5 shows the device according to the invention in a cross section while the measured product passes from the measuring chamber into the collecting chamber.
Figure 4:
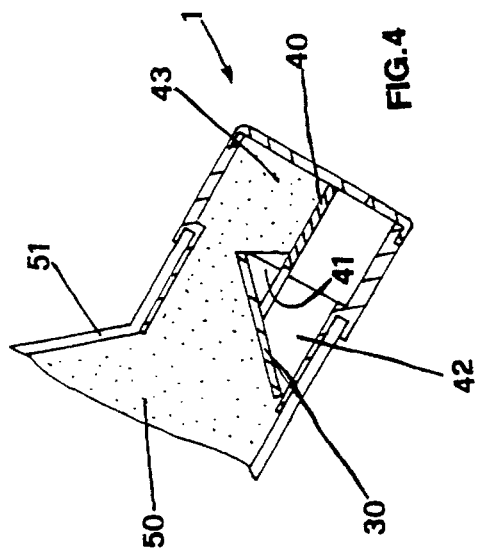
FIG. 4 shows the device according to the invention in a cross-section while the product is being measured.
Figure 6:
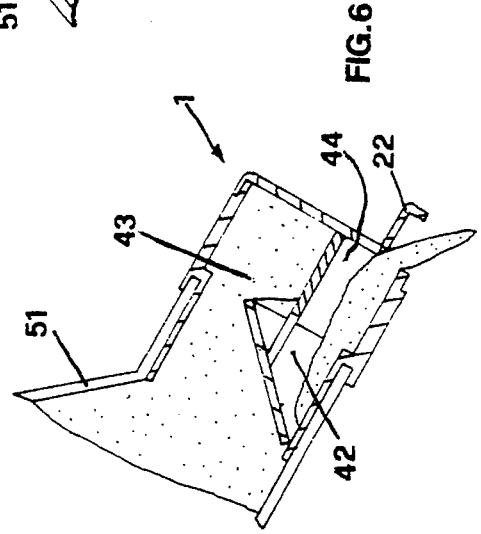
FIG. 6 shows the device according to the invention in a cross-section phase while the pro-measured product is being poured and a new quantity of product is being measured at the same time.

It can be observed that the measuring/dispensing device according to an embodiment of the invention shown in FIGS. 1–6 and indicated as a whole with 1, presents an essentially cylindrically shaded tubular body 10, and comprises a first element 11 which is suited to be inserted inside the container 51 which receives the measuring/dispensing device visible in the FIGS. 4, 5 and 6.

Figure 3:
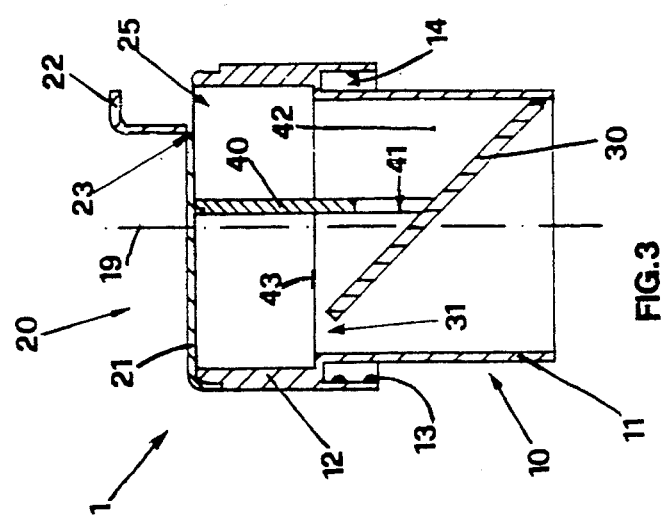
FIG. 3 shows in a cross-section the assembled measuring/dispensing device according to the invention.
Figure 7:
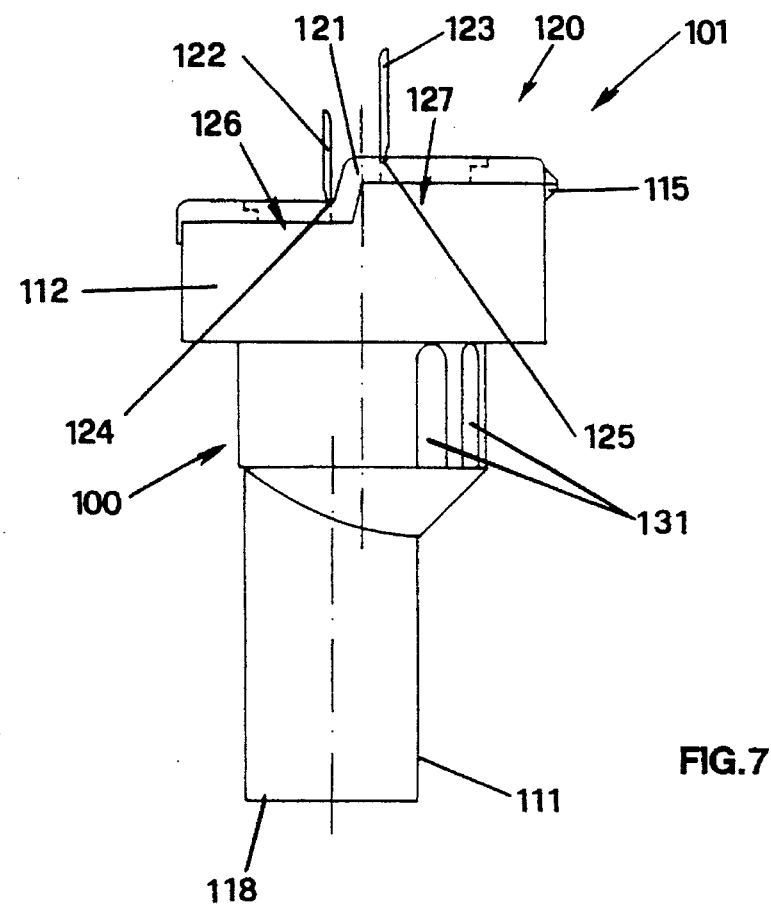
FIG. 7 shows in a cross-section a different embodiment of the measuring/dispensing device according to the invention.

The tubular body 10, also comprises a second element 12 which is arranged externally in relation to the first element and is coaxial with it said second element presenting in the inner wall a thread 13 visible in FIG. 3, which matches the corresponding thread found on the neck of the container 51 and matching the measuring/dispensing device.

Said container neck lodges in the annular space 14 which is comprised between element 12 and element 11.

Figure 2:
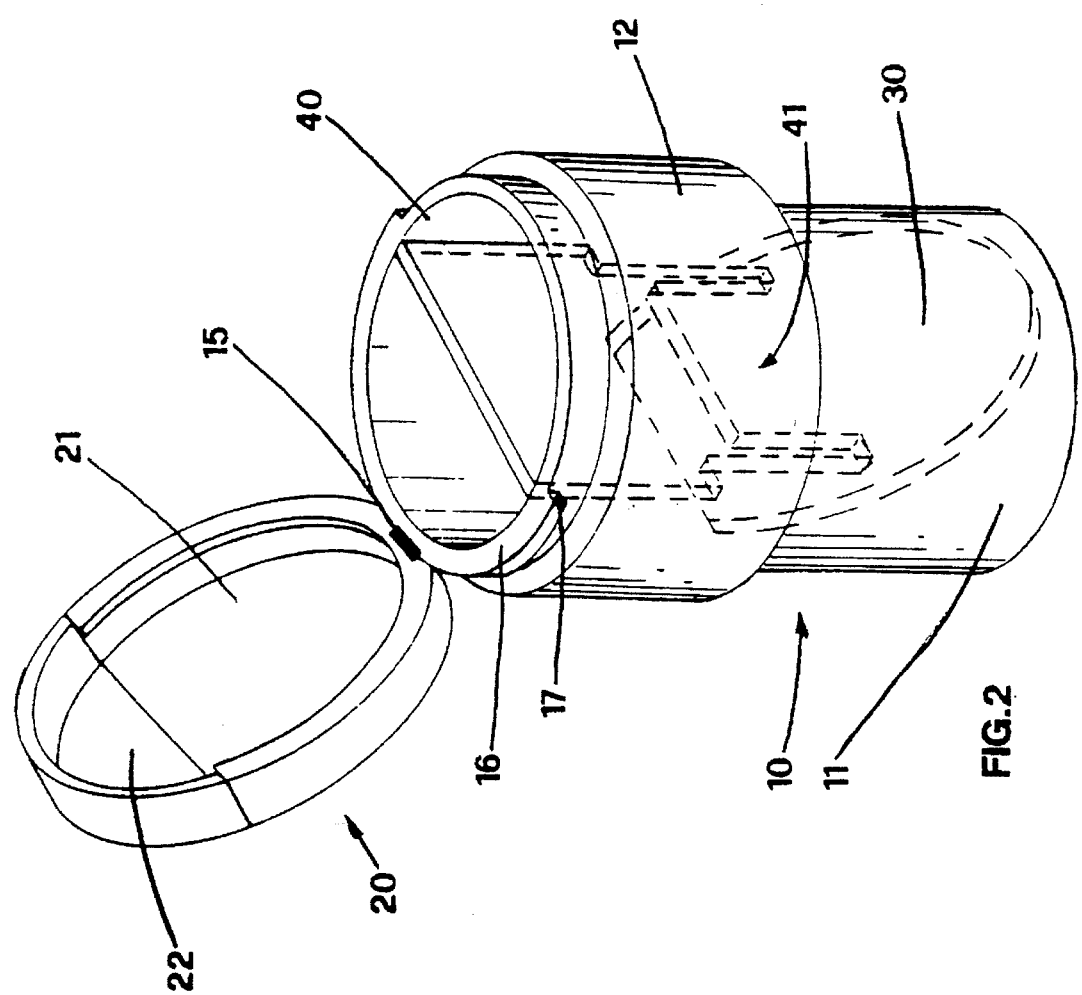
FIG. 2 shows the device of FIG. 1 in a cross-section with its lid lifted up.
Figure 1:
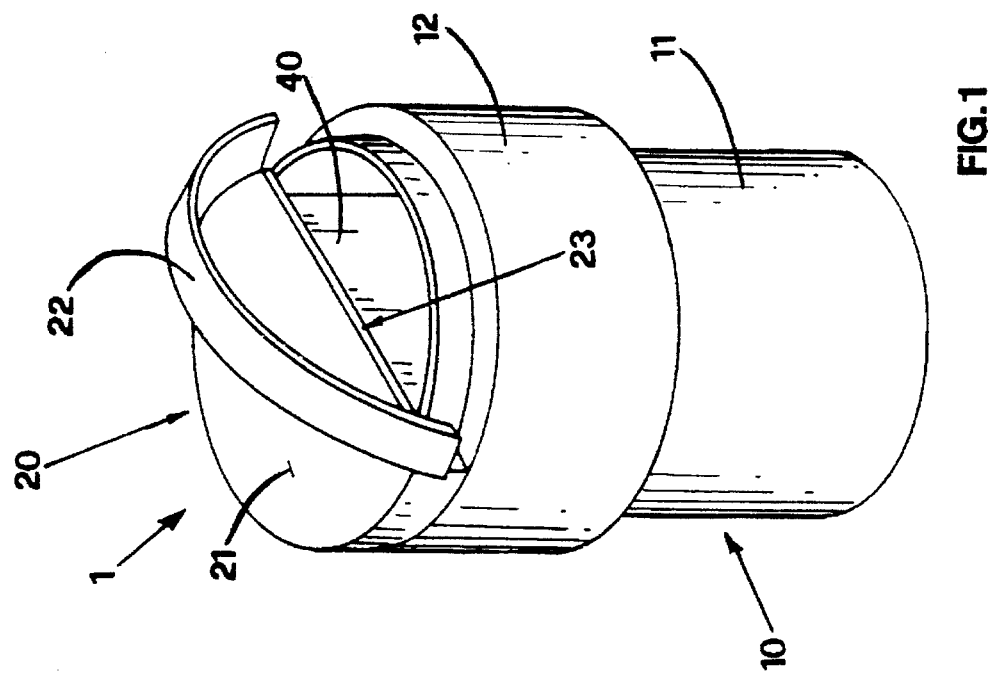
FIG. 1 shows the exploded view of the measuring/dispensing device according to the invention.

At the top, as can be more specifically observed in the FIGS. 2 and 1, the tubular body 10 is connected with a cap, indicated as whole with 20, by means of a first hinge consisting of a plastic strip 15.

The presence of an undercut 17 allows the cap to be firmly closed on the rim 16 of the tubular body; said undercut is fitted with a lid 22 which rotates in relation to the body 21 of the cap because of the presence of a second hinge consisting of a plastic strip 23. Said lid 22 can be easily opened and closed without any effort since it presents at the most a snap-shut element which can be removed when the device needs to be opened and its contents dispensed.

In the interior of the tubular body 10 there is a diaphragm 30 which is internally connected with the first element 11, and is arranged at a slanted position in relation to the axis 19 of the tubular body which presents a flat surface. Said diaphragm begins in correspondence with the lower rim of the element 11 and extends toward the upper area of the dispensing device.

A second diaphragm 40 departs from the upper rim of element 12 of the tubular body 10, it extends toward the bottom and stops before meeting the surface of the first diaphragm 30, so as to define an opening 41 between the first diaphragm 30 and the second one 40. Said opening 41 sets into communication both chambers 42 and 43, and each of them is delimited by the cap 20, by the cylindrical element 12 and, in the bottom area, by the first diaphragm 30 as well as by the second diaphragm 40 which divides said chambers. The FIGS. 4, 5 and 6 show how the product 50 held in the container can first be measured by passing through the opening 31 located in the measuring chamber 43, and then how the product can be transferred from the measuring chamber 43 to the collecting chamber 42 and how the product pours out from there through the dispensing duct 44.

More specifically it will be observed in FIG. 4 that, when the container 51 is capsized, the measuring dispensing/device is filled up in its measuring chamber 43 by the product 50 contained in container 51.

As can be well observed in FIG. 4, the first diaphragm 30 prevents the product 50 from flowing through the transit channel 41 from the measuring chamber 43 to the collecting chamber 42. In fact, the length of said diaphragm 30 is such, that the projection of the rim along the vertical line, meets the surface of the second diaphragm 40, thus preventing the product from flowing through the opening 41. When container 51 is brought back to its upright position, as is shown in FIG. 5, the product contained in the measuring chamber 43 falls by gravity downwardly into the underlying collecting chamber 42 belonging to the first element 2, wherein it remains until container 51 is capsized again, as can be observed in the Figure.

The slanted position of diaphragm 30 makes it easier for the powder to flow and, therefore, to pile up at the bottom of collecting chamber 42.

Thereafter, another capsizing of container 51, and, as a consequence, of the measuring device 1, after lid 22 has been opened, allows the measured and collected dose to exit from opening 25 communicating with the dispensing duct 44. This movement permits a reloading of the dose in the measuring chamber 43, while preventing said second dose from passing through opening 41 and this thanks to the specific geometry obtained.

The position of diaphragm 40 is preferably vertical, i.e. parallel to axis 19 of the measuring device 1, but it does not have to be.

A different embodiment of the measuring device according to the invention is represented in the FIGS. from 7 to 12, wherein it is indicated as a whole with 101.

It will be observed that in such an embodiment the measuring/dispensing device presents again a tubular body 100, having an essentially cylindrical shape, its first element 111, suited to fit inside the container, is closed in this case in the lower section by a bottom 118.

Figure 8:
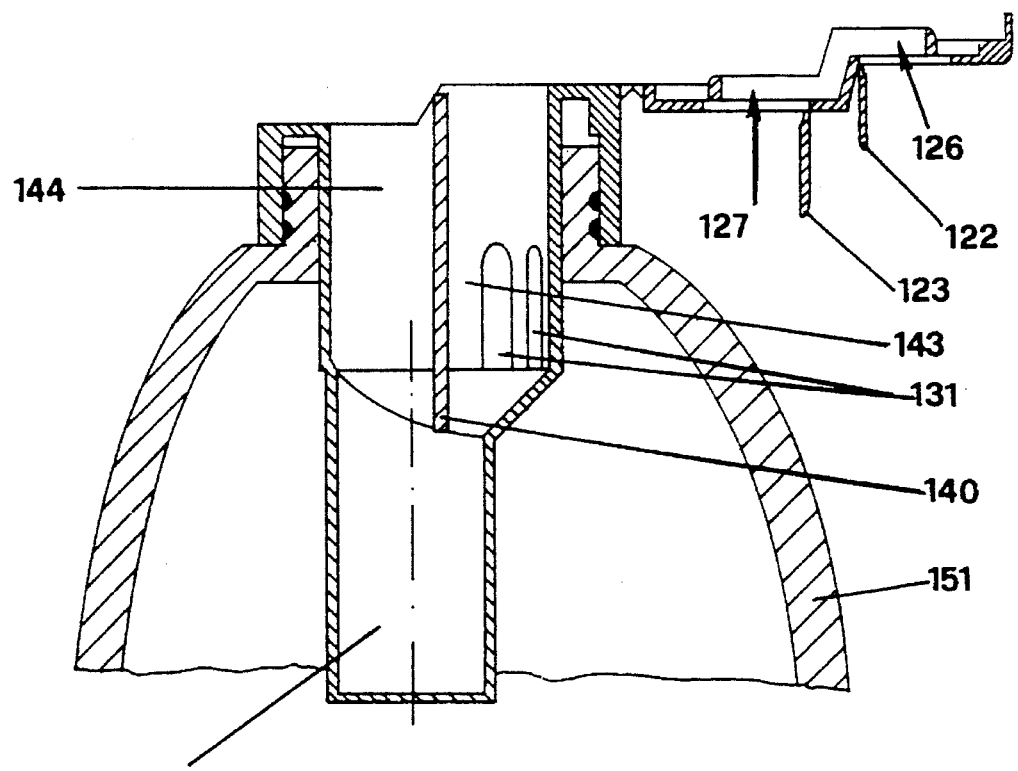
FIG. 8 shows the embodiment of the measuring/dispensing device of FIG. 7, applied to a container.

Said first part 111, as can be observed in FIG. 8 is provided with a single diaphragm 140, arranged inside the tubular body 100 and essentially parallel with its longitudinal axis which runs through a section of its length.

Said diaphragm 140 defines inside said tubular body 100 a measuring chamber 143 and a dispensing duct 144, which are separate from each other, both overlying a collecting chamber 142 defined at its bottom by bottom 118.

It will be observed that in this embodiment, too, the measuring chamber 143 communicates with the inside of container 151 on which the device is applied, through openings 131 made laterally in said first element 111 which defines the tubular body 100.

It will be observed that this particular embodiment is complete with a cap, indicated as a whole with 120, attached to the tubular body 100 and more specifically to its second element 112 through a first hinge 115 consisting of a strip made of plastic material.

Said cap is in turn provided with a first lid 122 and with a second lid 123, both lids being connected with the body 121 of said cap 120 through a second hinge 124 and a third hinge 125 respectively.

All said hinges consist of strips made of plastic material in a single piece with the tubular body 100 or with body 121 of cap 120.

More in detail, said first lid 122 is suited to intercept a first opening 126 communicating with the dispensing duct 144, while said second lid 123 is suited to intercept a second opening 127 communicating with the measuring chamber 143.

Figure 9:
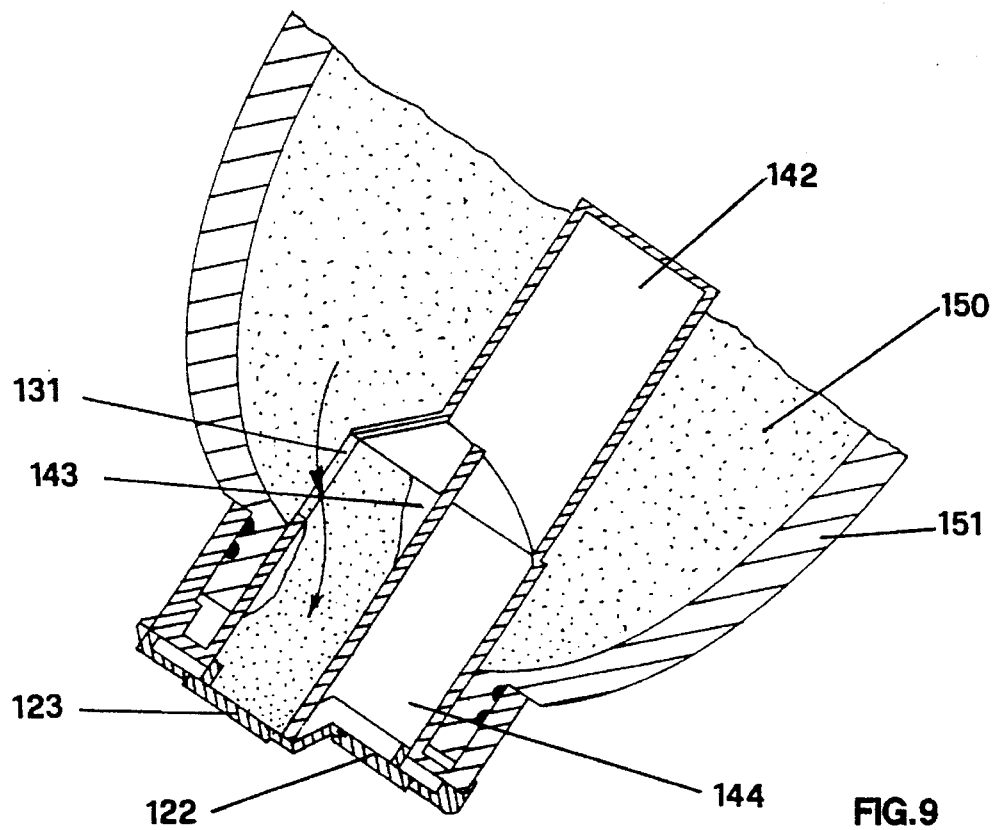
FIG. 9 shows the measuring/dispensing device of FIG. 8 while the product is being measured.

This different embodiment of the invention, too, permits, as can be observed in FIG. 9, to fill up the measuring chamber 143 with the product 150 held in container 151 when the container is tilted, as represented in FIG. 9, so that the product flows through the openings 131.

Figure 10:
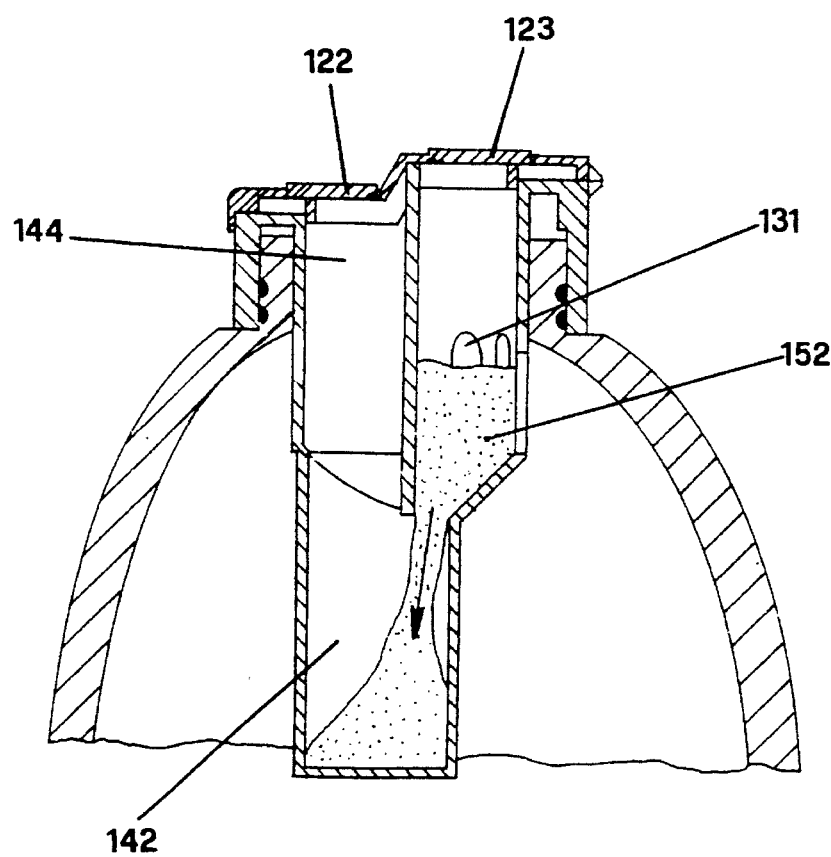
FIG. 10 shows the measuring/dispensing device of FIG. 9, while the measured quantity is transferred from the measuring character into the collecting chamber.

When the container is returned to its upright position, as can be observed in FIG. 10, the measured quantity, indicated with 152, falls by gravity into the collecting chamber 142.

Figure 11:
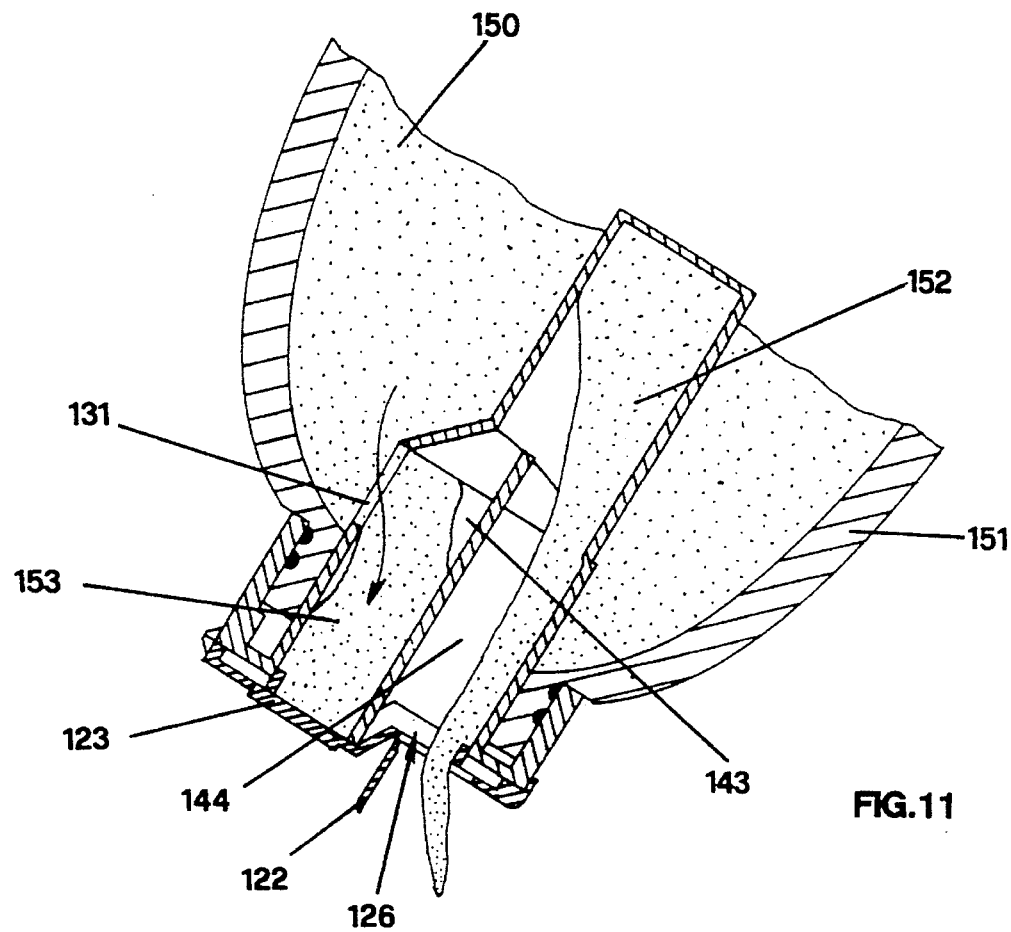
FIG. 11 shows the measuring/dispensing device of FIG. 10 while the pre-measured quantity is being poured and simultaneously a new quantity of product is being measured.

Then, by tilting container 151 again into the position shown in FIG. 11, the measured quantity 152 is poured out passing through the dispensing duct 144 and the first opening 126, after the first lid 122 has been opened, while another dose of product 153 is measured at the same time in the measuring chamber 143, flowing through the openings 131.

It will be observed that during said measuring and dispensing operations the second lid 123 remains closed.

Figure 12:
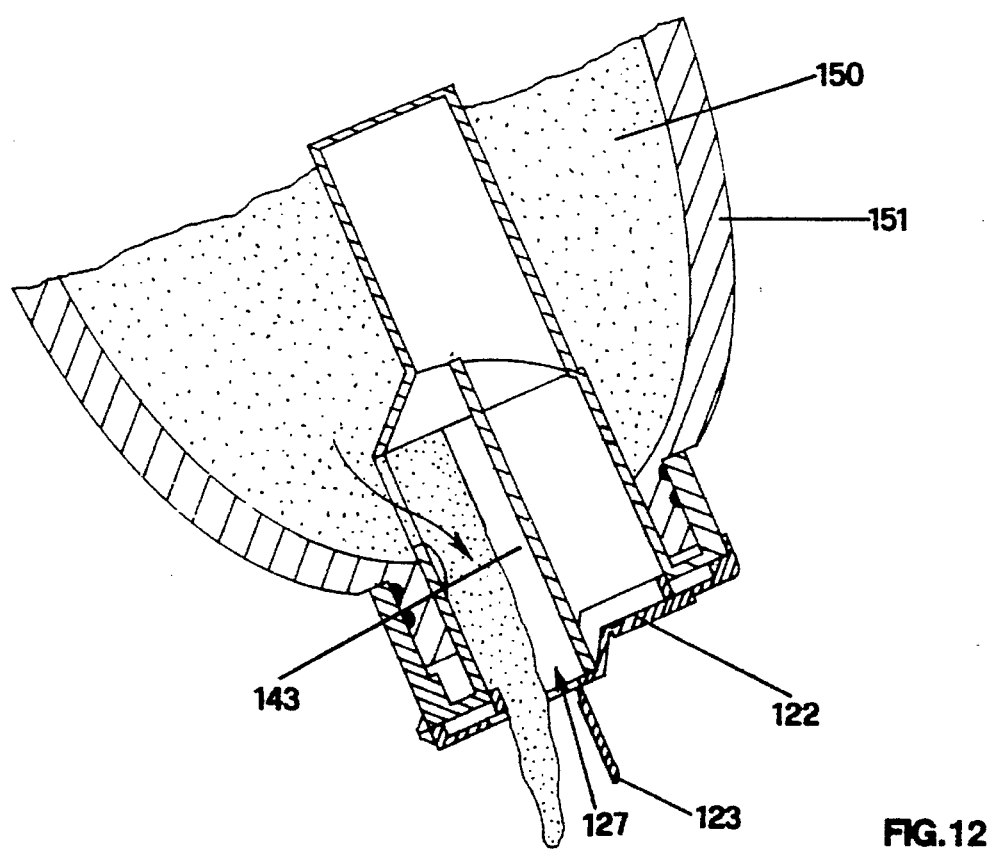
FIG. 12 shows the measuring/dispensing device of FIG. 8 during a continuous dispensing operation.

When, on the other hand, the user wants to pour the product continuously, as can be observed in FIG. 12, he keeps the first lid 122 closed, opens the second lid 123 and tilts the container.

In this case the product pours from container 151 into the measuring chamber 143, passing through the openings 131 and from there, passing through the second opening 127 which is present in cap 120, it is poured out continuously.

On the basis of what has been described it is easy to understand how the measuring/dispensing device according to the invention in both the described embodiments permits to reach the proposed purposes, i.e. to allow the measuring of a well determined and constant quantity for each dose.

Moreover, because of its constructive shape the measuring/dispensing device can be manufactured in a single piece, thereby simplifying both the manufacturing process and eliminating the assembly operations.

Moreover, in the second described embodiment it is possible to obtain both the continuous outpour of the product and the discrete outpour of measured quantities.

Any variation and modification of the described measuring/dispensing device and of the elements forming it, concerning the shape and the dimensions must be considered within the scope and spirit of the present invention.

I claim:

1. A measuring/dispensing device for granular or powder products comprising:

a tubular body having a first part, adapted to be inserted in the neck of a product container, and a second part, external and coaxial with the first part, provided with elements for connecting it rigidly with the neck of said container;

a cap, connected with the tubular body through a first hinge which closes with a snap on the rim of the tubular body, a lid connected with said cap through a second hinge and adapted to be opened by rotation about said second hinge, and said tubular body having in its interior at least one diaphragm dividing the inner volume and defining a measuring chamber, communicating with the interior of said container close to an end of said diaphragm, and a collecting chamber being connected with a dispensing duct arranged in a top section in correspondence with the cap and communicating with the outside environment; wherein said lid includes a first lid portion communicating through a first opening with the dispensing duct and a second lid portion communicating through a second opening with the measuring chamber.

2. A measuring/dispensing device according to claim 1, wherein said tubular body has in its interior a single diaphragm arranged essentially parallel to the longitudinal axis of the tubular body and extending along part of its length, said single diaphragm defining with the inner wall of the tubular body wherein it is inserted, on one side a measuring chamber communicating by means of openings with the interior of the container and, on the opposite side, a duct for dispensing the product, said measuring chamber and said dispensing duct communicating at the bottom with the same collecting chamber defined between an end area of the tubular body and a closing bottom applied to it.

3. A measuring/dispensing device according to claim 2, wherein the opening in the tubular body establishes a communication path with the measuring chamber, the collecting chamber and the duct forming a through path for the products from the interior of the container.

4. A measuring/dispensing device according to claim 1, characterized in that said cap (20) presents a lid (22) communicating through an opening (25) with the dispensing duct (44).

5. A measuring/dispensing device according to claim 1, wherein the rim is formed with an undercut and the cap has a portion matching the undercut.

6. A measuring/dispensing device for granular or powder products comprising:

a tubular body having a first part, for insertion into the neck of a product container and a second part, external to and coaxial with the first part, said tubular body including elements for connecting it rigidly with the neck of said container and a rim;

a cap connected with the tubular body through a first hinge, said cap engaging the rim of the tubular body with a snap action, and including at least one lid connected with said cap through a second hinge and fit to be opened by rotation about said second hinge, said tubular body including at least one diaphragm interior thereof dividing the inner volume and defining a measuring chamber for communicating with the interior of said container close to a lower end of said diaphragm and a collecting chamber being connected with a dispensing duct arranged in an upper section in correspondence with the cap for communicating with the outside environment, wherein said cap includes a first lid portion communicating through a first opening with the dispensing duct and a second lid portion communicating through a second opening with the measuring chamber.

7. A measuring/dispensing device according to claim 6, wherein said tubular body has in its interior a single diaphragm arranged essentially parallel to the longitudinal axis of the tubular body itself and running along part of its length, said single diaphragm defining with the inner wall of the tubular body wherein it is inserted, on one side a measuring chamber communicating by means of openings with the interior of the container and, on the opposite side, a duct for dispensing the product.

8. A measuring/dispensing device according to claim 7, wherein said openings setting into communication said measuring chamber with the interior of the container extend through the tubular body into correspondence with said measuring chamber.

9. A measuring/dispensing device according to claim 6, wherein said cap presents a lid communicating through an opening with the dispensing duct.

10. A measuring/dispensing device according to claim 6, wherein the cap engages the tubular body with snap action through a rim in which has an undercut.

* * * * *

UNITED STATES PATENT AND TRADEMARK OFFICE
CERTIFICATE OF CORRECTION

PATENT NO. : 5,480,071
DATED : January 2, 1996
INVENTOR(S) : Evans Santagiuliana It is certified that error appears in the above-indentified patent and that said Letters Patent is hereby corrected as shown below:

On the title page, item [22] as follows:

[22] PCT Filed: February 11, 1993

Add entries [86] and [87] as follows:

[86] PCT No.: PCT/EP93/00328
§371 Date: June 10, 1994
§102(e) Date: June 10, 1994

[87] PCT Pub. No.: WO 93/16358
PCT Pub. Date: August 19, 1993

Signed and Sealed this

Sixth Day of August, 1996

*Attest:*

BRUCE LEHMAN

*Attesting Officer*     *Commissioner of Patents and Trademarks*